(12) United States Patent
Wang et al.

(10) Patent No.: US 10,172,100 B2
(45) Date of Patent: *Jan. 1, 2019

(54) WIRELESS DEVICE AND POWER CONTROL METHOD

(71) Applicant: Sun Patent Trust, New York, NY (US)

(72) Inventors: Lilei Wang, Beijing (CN); Hidetoshi Suzuki, Kanagawa (JP); Masayuki Hoshino, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,435

(22) Filed: Mar. 5, 2018

(65) Prior Publication Data

US 2018/0199294 A1 Jul. 12, 2018

Related U.S. Application Data

(63) Continuation of application No. 15/634,826, filed on Jun. 27, 2017, now Pat. No. 9,942,860, which is a
(Continued)

(51) Int. Cl.
*H04W 52/32* (2009.01)
*H04W 52/24* (2009.01)
(Continued)

(52) U.S. Cl.
CPC ........ *H04W 52/325* (2013.01); *H04B 17/318* (2015.01); *H04W 52/242* (2013.01); *H04W 52/383* (2013.01); *H04W 52/243* (2013.01)

(58) Field of Classification Search
CPC .......................... H04W 52/242; H04W 52/247
(Continued)

(56) References Cited

U.S. PATENT DOCUMENTS

| 8,208,951 B2 | 6/2012 | Yamamoto |
| 8,577,408 B2 | 11/2013 | Yamamoto |

(Continued)

FOREIGN PATENT DOCUMENTS

| EP | 1 865 614 A1 | 12/2007 |
| JP | 2008-244960 A | 10/2008 |

(Continued)

OTHER PUBLICATIONS

International Search Report dated Oct. 27, 2014, for corresponding International Application No. PCT/CN2014/071584, 2 pages.
(Continued)

*Primary Examiner* — John J Lee
(74) *Attorney, Agent, or Firm* — Seed IP Law Group LLP

(57) ABSTRACT

The present disclosure provides a power control method and a wireless device, in a cluster comprised of wireless devices including a first wireless device and a second wireless device, comprising: receiving power control information including a second data channel transmission power, from the second wireless device; determining a first data channel transmission power based on the second data channel transmission power; and controlling data channel transmission power of the first wireless device according to the first data channel transmission power; wherein, the first data channel transmission power is a power allowing the first wireless device to reach all wireless devices in the cluster, and the second data channel transmission power is a power allowing the second wireless device to reach all wireless devices in the cluster.

6 Claims, 5 Drawing Sheets

Related U.S. Application Data continuation of application No. 15/109,413, filed as application No. PCT/CN2014/071584 on Jan. 27, 2014, now Pat. No. 9,723,575.

(51) Int. Cl.
*H04W 52/38* (2009.01)
*H04B 17/318* (2015.01)

(58) Field of Classification Search
USPC .......... 455/522, 69, 41.2, 41.1, 452.1, 509
See application file for complete search history.

(56) References Cited

U.S. PATENT DOCUMENTS

| | | | |
|---|---|---|---|
| 9,161,320 B2* | 10/2015 | Park | ............. H04W 52/46 |
| 9,271,244 B2 | 2/2016 | Li et al. | |
| 9,426,788 B2* | 8/2016 | Hakola | ............. H04W 76/14 |
| 2008/0242338 A1 | 10/2008 | Yamamoto | |
| 2011/0165908 A1 | 7/2011 | Yamamoto | |
| 2011/0275382 A1 | 11/2011 | Hakola et al. | |
| 2012/0163252 A1 | 6/2012 | Ahn et al. | |
| 2013/0244715 A1 | 9/2013 | Kwon et al. | |
| 2013/0288608 A1 | 10/2013 | Fwu et al. | |
| 2013/0310103 A1 | 11/2013 | Madan et al. | |
| 2015/0078279 A1 | 3/2015 | Ko et al. | |
| 2016/0142986 A1* | 5/2016 | Seo | ............. H04W 4/70 455/422.1 |
| 2016/0198414 A1* | 7/2016 | Yano | ............. H04W 52/242 455/522 |
| 2016/0227493 A1 | 8/2016 | Kwak et al. | |

FOREIGN PATENT DOCUMENTS

| | | |
|---|---|---|
| WO | 2012/0166969 A1 | 12/2012 |
| WO | 2013/162333 A1 | 10/2013 |

OTHER PUBLICATIONS

Extended European Search Report dated Dec. 12, 2016, for corresponding EP Application No. 14880241.6-1855 / 3100532, 9 pages.

* cited by examiner

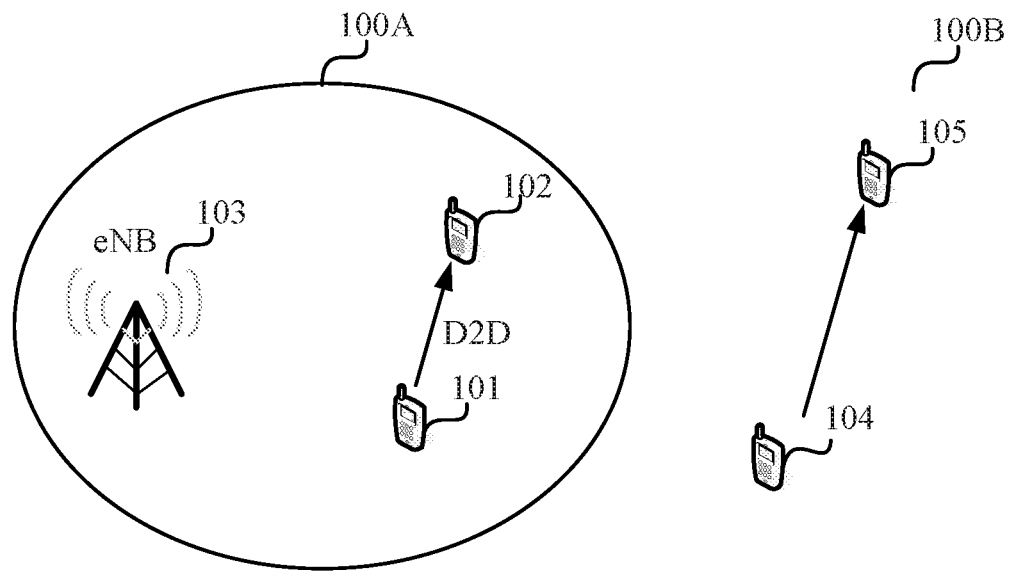
Fig.1
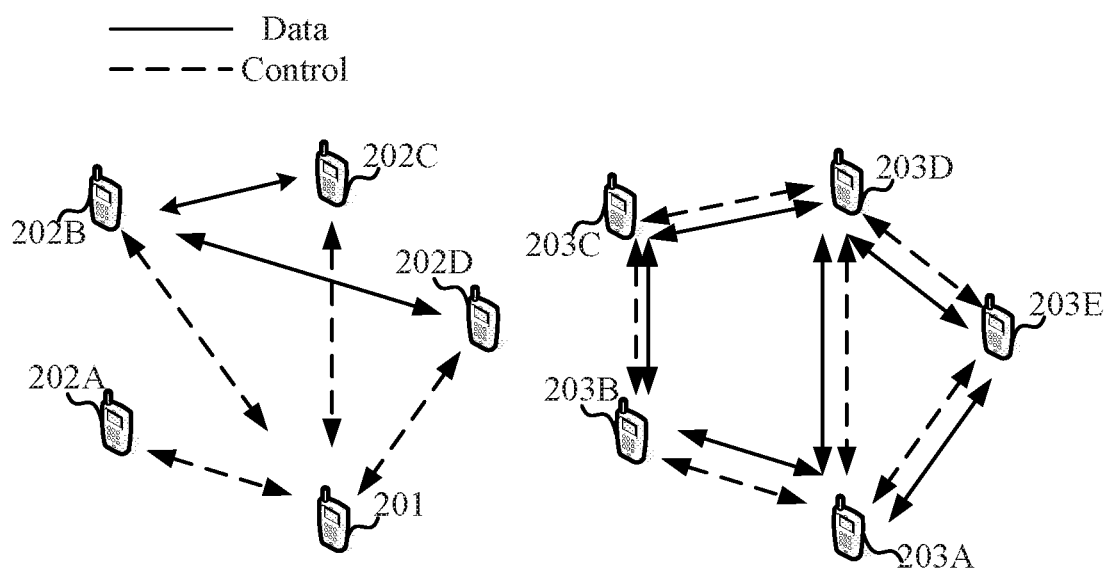
Fig.2A                    Fig.2B

WIRELESS DEVICE AND POWER CONTROL METHOD

BACKGROUND

Technical Field

The present disclosure relates to the communication field, and in particular, to a wireless device and a power control method in a wireless communication system.

Description of the Related Art

D2D (device to device) is a new topic in 3GPP LTE release 12, and the main target for such study item is to realize direct device-to-device communication. D2D communication could happen within network coverage (for commercial case) and without network coverage (for public safety).

FIG. 1 is a schematic diagram showing two D2D communication scenarios. As shown in FIG. 1, in a scenario 100A shown in the left part of FIG. 1, two wireless devices 101 and 102 realize direct device-to-device communication, within network coverage by eNode B 103; while in the other scenario 100B shown in the right part of FIG. 1, two wireless devices 104 and 105 realize direct device-to-device communication without network coverage.

In Rel.12, the focus on D2D communication is mainly out-of-network coverage scenario and broadcasting traffic.

One issue on out-of-network coverage scenario is the structure of D2D communication. Currently there are two candidates for the structure of D2D communication basically: 1) centralized structure as shown in FIG. 2A; and 2) distributed structure as shown in FIG. 2B.

FIGS. 2A and 2B are schematic diagrams showing a centralized structure and a distributed structure in D2D communication, respectively.

In FIG. 2A, the solid line represents the data signal and the dashed line represents the control signal. It can be seen that there are two kinds of wireless device (which may be also referred to as user equipment, UE), the cluster head (or master UE) 201 and the slave UEs 202A-202D, in the centralized scenario. Signaling is controlled by the cluster head, but data could be directly transmitted from a slave UE to another slave UE in such scenario.

In FIG. 2B, similarly, the solid line represents the data signal and the dashed line represents the control signal. It can be seen that, there is no definition of cluster head (or master UE) and slave UE in the distributed scenario. The identifications of all the UEs 203A-203E are equal. The control signaling and data are both transmitted from a transmitting UE to a receiving UE.

Another issue on D2D communication is the power control problem. Currently, there is no power control based on most companies' understanding. Thus a maximum power transmission is the basic assumption. This would cause large power consumption and interference to other UEs.

FIG. 3 is a schematic diagram showing the problem caused due to the maximum power transmission. As shown in FIG. 3, it is desirable for a transmitting UE 301 to transmit data and signaling to the receiving UEs 302A-302C in a cluster to which the transmitting UE 301 belongs. Thus, the optimal transmission power range is as shown by the ellipse in the dashed line in FIG. 3. However, the maximum transmission power range is as shown by the ellipse in the solid line in FIG. 3. Therefore, it causes not only a large power consumption of the transmitting UE 301, but also a large interference to the non-targeted UEs 303A and 303B.

BRIEF SUMMARY

The present disclosure is made in consideration of the above aspects.

According to a first aspect of the present disclosure, a power control method performed by a first wireless device is provided, in a cluster comprised of wireless devices including the first wireless device and a second wireless device, comprising: receiving power control information including a second data channel transmission power, from the second wireless device; determining a first data channel transmission power based on the second data channel transmission power; and controlling data channel transmission power of the first wireless device according to the first data channel transmission power; wherein, the first data channel transmission power is a power allowing the first wireless device to reach all wireless devices in the cluster, and the second data channel transmission power is a power allowing the second wireless device to reach all wireless devices in the cluster.

According to a second aspect of the present disclosure, a power control method performed by a second wireless device is provided, in a cluster comprised of wireless devices including a first wireless device and the second wireless device, comprising: acquiring second data channel transmission power; and transmitting power control information including the second data channel transmission power, to the first wireless device; wherein, data channel transmission power of the first wireless device is controlled, according to a first data channel transmission power determined based on the second data channel transmission power; the first data channel transmission power is a power allowing the first wireless device to reach all wireless devices in the cluster, and the second data channel transmission power is a power allowing the second wireless device to reach all wireless devices in the cluster.

According to a third aspect of the present disclosure, a power control method in a cluster comprised of wireless devices including a first wireless device and a second wireless device is provided, comprising: acquiring a second data channel transmission power by the second wireless device; transmitting power control information including the second data channel transmission power to the first wireless device, by the second wireless device; receiving the power control information from the second wireless device, by the first wireless device; determining a first data channel transmission power based on the second data channel transmission power, by the first wireless device; and controlling data channel transmission power of the first wireless device according to the first data channel transmission power, by the first wireless device; wherein, the first data channel transmission power is a power allowing the first wireless device to reach all wireless devices in the cluster, and the second data channel transmission power is a power allowing the second wireless device to reach all wireless devices in the cluster.

According to a fourth aspect of the present disclosure, a wireless device is provided, in a cluster comprised of wireless devices including the wireless device as a first wireless device, and a second wireless device, comprising: a receiver which receives power control information including a second data channel transmission power from the second wireless device; a determining unit which determines a first data channel transmission power based on the second data channel transmission power; and a controller which controls data channel transmission power of the first wireless device according to the first data channel transmission power; wherein, the first data channel transmission power is a power allowing the first wireless device to reach all wireless devices in the cluster, and the second data channel transmission power is a power allowing the second wireless device to reach all wireless devices in the cluster.

According to a fifth aspect of the present disclosure, a wireless device, in a cluster comprised of wireless devices including a first wireless device and the wireless device as a second wireless device, comprising: an acquiring unit which acquires second data channel transmission power; and a transmitter which transmits power control information including the second data channel transmission power, to the first wireless device; wherein, data channel transmission power of the first wireless device is controlled, according to a first data channel transmission power determined based on the second data channel transmission power; the first data channel transmission power is a power allowing the first wireless device to reach all wireless devices in the cluster, and the second data channel transmission power is a power allowing the second wireless device to reach all wireless devices in the cluster.

According to the power control method and the wireless device of some aspects of the present disclosure, the power consumption of the wireless device and the interference to non-targeted wireless devices can be reduced in different scenarios of the D2D communication.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

These and/or other aspects and advantages of the present disclosure will become more distinct and easier to be understood in a detailed description of embodiments of the present disclosure below in combination with attached drawings, in which:

FIG. 1 is a schematic diagram showing two scenarios of D2D communication;

FIGS. 2A and 2B are schematic diagrams showing a centralized structure and a distributed structure in D2D communication, respectively;

DETAILED DESCRIPTION

Figure 3:
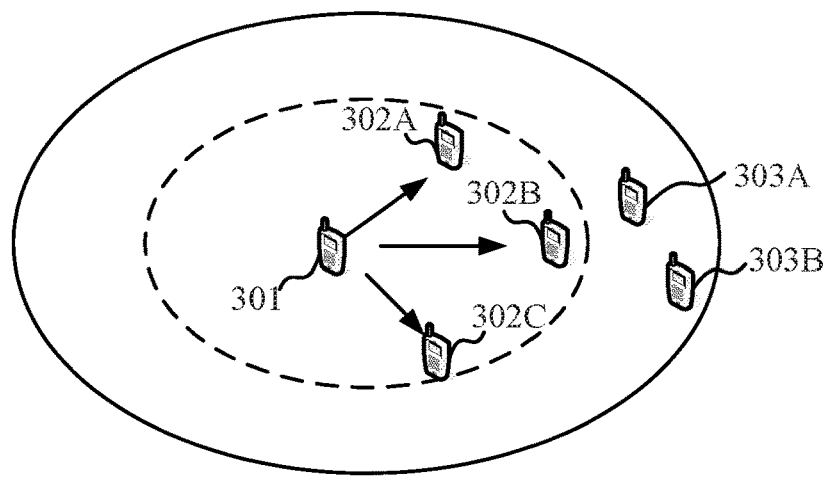
FIG. 3 is a schematic diagram showing the problem caused due to maximum power transmission in D2D communication.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

Figure 4:
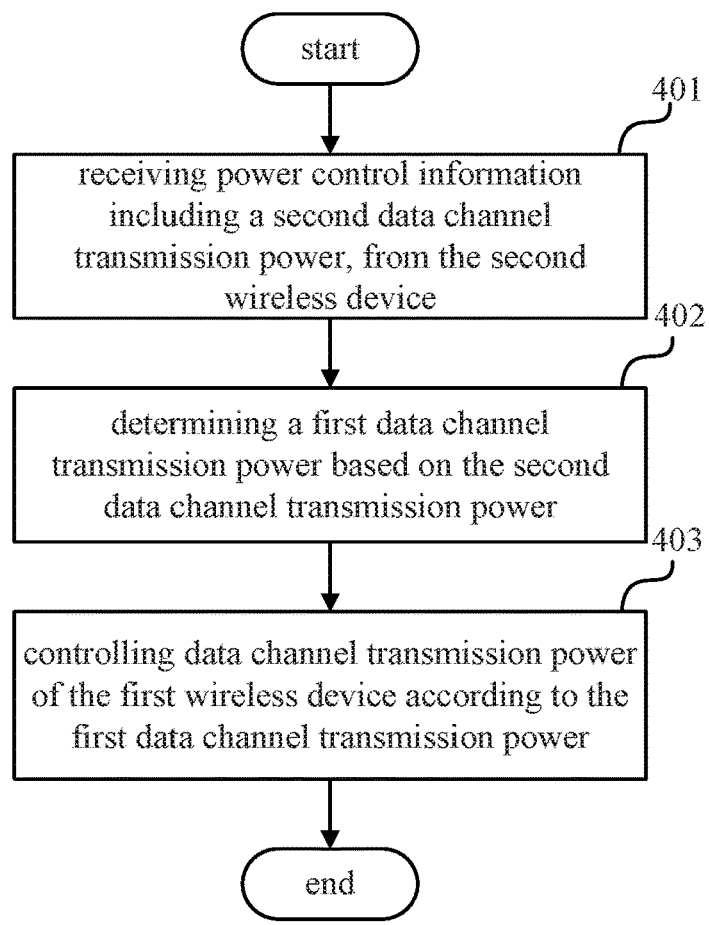
FIG. 4 is a flowchart showing a power control method by a wireless device according to an embodiment of the present disclosure.

FIG. 4 is a flowchart showing a power control method by a wireless device (user equipment, UE) according to the embodiment of the present disclosure. The UE and at least one other UE may form a cluster, and the UE may perform direct communication with the other UE, with a transmission power large enough to reach all the UEs in the cluster. In the following description, in order to distinguish, the wireless device will be referred to as the first wireless device, and the other wireless device will be referred to as the second wireless device.

As shown in FIG. 4, in the embodiment of the present disclosure, at the first wireless device side, first, at Step 401, power control information including a second data channel transmission power is received from the second wireless device. The second data channel transmission power is a power allowing the second wireless device to reach all wireless devices in the cluster. That is, the second data channel transmission power may not be the maximum transmission power of the second wireless device, as long as it is large enough to allow the second wireless device to communicate with all wireless devices including the first wireless device in the cluster.

Then, at Step 402, a first data channel transmission power is determined based on the second data channel transmission power. Similarly to the second data channel transmission power, the first data channel transmission power is a power allowing the first wireless device to reach all wireless devices in the cluster. That is, the first data channel transmission power may not be the maximum transmission power of the first wireless device, as long as it is large enough to allow the first wireless device to communicate with all wireless devices including the second wireless device in the cluster. The determination process of the first data channel transmission power will be described later in detail in combination with several embodiments.

Then, after determining the first data channel transmission power, at Step 403, the data channel transmission power of the first wireless device is controlled according to the first data channel transmission power. For example, the data channel transmission power of the first wireless device may be controlled to be the first data channel transmission power.

Figure 5:
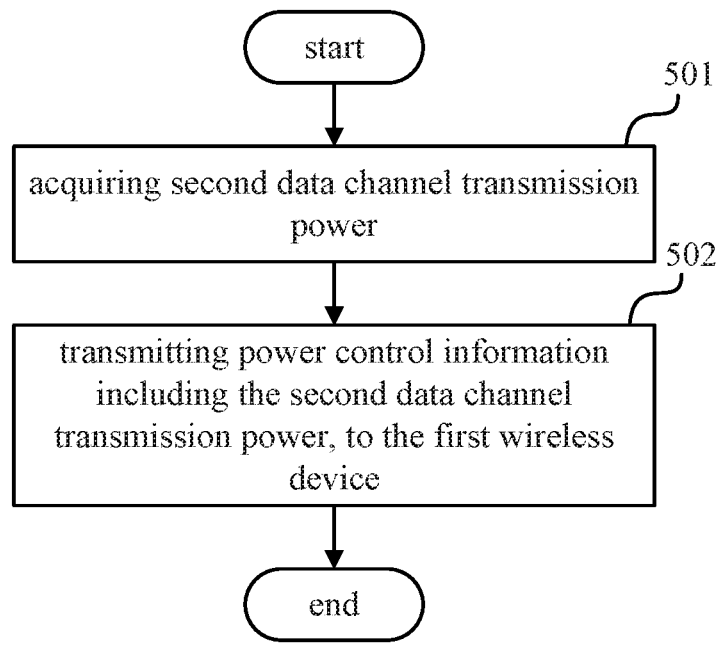
FIG. 5 is a flowchart showing a power control method by a wireless device according to another embodiment of the present disclosure.

FIG. 5 is a flowchart showing a power control method performed by the second wireless device. As shown in FIG. 5, in the embodiment, at the second wireless device side, first, the second data channel transmission power is acquired at Step 501. The process of acquiring the second data channel transmission power will be described later in detail in combination with several embodiments.

Then, the power control information including the second data channel transmission power is transmitted to the first wireless device at Step 502. As described above, the power control information is used to determine the first data channel transmission power, so that the data channel transmission power of the first wireless device is controlled according to the first data channel transmission power. The meanings of the first data channel transmission power and the second data channel transmission power have been described above, and are not described here in detail.

That is, in the embodiments of the present disclosure, for the cluster including the first wireless device and the second wireless device, a power control method is provided as follows. First, the second data channel transmission power is acquired by the second wireless device. Then, the power control information including the second data channel transmission power is transmitted to the first wireless device, by the second wireless device. Accordingly, the power control information is received from the second wireless device, by the first wireless device. Next, the first data channel transmission power is determined based on the second data channel transmission power, by the first wireless device. At last, the data channel transmission power of the first wireless device is controlled according to the first data channel transmission power, by the first wireless device.

Figure 6:
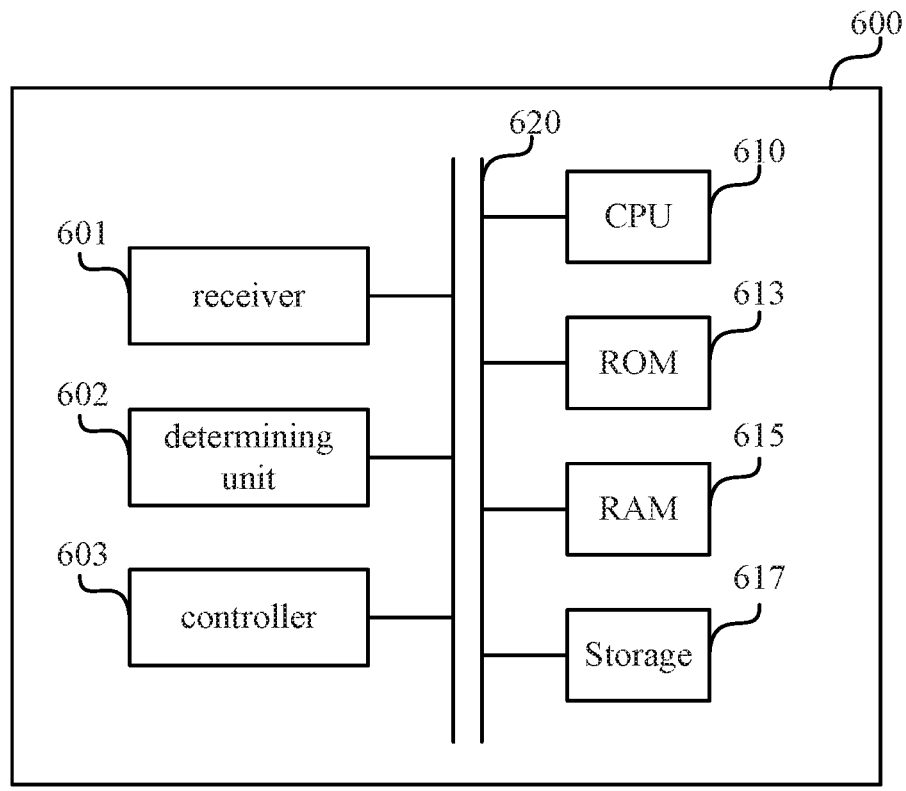
FIG. 6 is a block diagram showing a schematic structure of a wireless device according to an embodiment of the present disclosure.

FIG. 6 is a block diagram showing the schematic structure of a wireless device 600 according to the embodiment of the present disclosure. As shown in FIG. 6, the wireless device 600 as the first wireless device comprises a receiver 601 which receives power control information including a second data channel transmission power from the second wireless device; a determining unit 602 which determines a first data channel transmission power based on the second data channel transmission power; and a controller 603 which controls data channel transmission power of the first wireless device according to the first data channel transmission power.

Similarly to those described with reference to FIGS. 4 and 5, the first data channel transmission power is a power allowing the first wireless device to reach all wireless devices in the cluster, and the second data channel transmission power is a power allowing the second wireless device to reach all wireless devices in the cluster.

The wireless device 600 according to the embodiment may optionally include a CPU (Central Processing Unit) 610 for executing related programs to process various data and control operations of respective units in the wireless device 600, a ROM (Read Only Memory) 613 for storing various programs required for performing various process and control by the CPU 610, a RAM (Random Access Memory) 615 for storing intermediate data temporarily produced in the procedure of process and control by the CPU 610, and/or a storage unit 617 for storing various programs, data and so on. The above receiver 601, the determining unit 602, the controller 603, CPU 610, ROM 613, RAM 615 and/or storage unit 617 etc. may be interconnected via data and/or command bus 620 and transfer signals between one another.

Respective units as described above do not limit the scope of the present disclosure. According to one implementation of the disclosure, the functions of the above receiver 601, the determining unit 602 and the controller 603 may be implemented by hardware, and the above CPU 610, ROM 613, RAM 615 and/or storage unit 617 may not be necessary. Alternatively, the functions of the above receiver 601, the determining unit 602 and the controller 603 may also be implemented by functional software in combination with the above CPU 610, ROM 613, RAM 615 and/or storage unit 617 etc.

Figure 7:
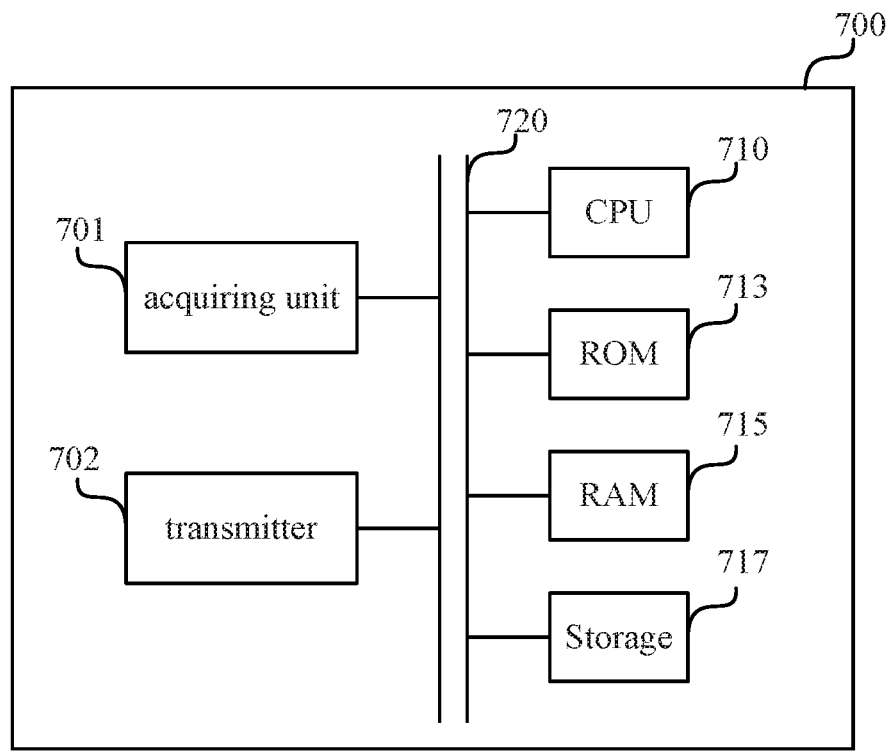
FIG. 7 is a block diagram showing a schematic structure of a wireless device according to another embodiment of the present disclosure.

FIG. 7 is a diagram showing a schematic structure of a wireless device 700 according to the embodiment of the present disclosure. As shown in FIG. 7, the wireless device 700 as the second wireless device comprises an acquiring unit 701 which acquires second data channel transmission power; and a transmitter 702 which transmits power control information including the second data channel transmission power, to the first wireless device. The data channel transmission power of the first wireless device is controlled, according to a first data channel transmission power determined based on the second data channel transmission power.

Similarly to those described with reference to FIGS. 4 and 5, the first data channel transmission power is a power allowing the first wireless device to reach all wireless devices in the cluster, and the second data channel transmission power is a power allowing the second wireless device to reach all wireless devices in the cluster.

The wireless device 700 according to the embodiment may optionally include a CPU (Central Processing Unit) 710 for executing related programs to process various data and control operations of respective units in the wireless device 700, a ROM (Read Only Memory) 713 for storing various programs required for performing various process and control by the CPU 710, a RAM (Random Access Memory) 715 for storing intermediate data temporarily produced in the procedure of process and control by the CPU 710, and/or a storage unit 717 for storing various programs, data and so on. The above acquiring unit 701, transmitter 702, CPU 710, ROM 713, RAM 715 and/or storage unit 717 etc. may be interconnected via data and/or command bus 720 and transfer signals between one another.

Respective units as described above do not limit the scope of the present disclosure. According to one implementation of the disclosure, the functions of the above acquiring unit 701 and transmitter 702 may be implemented by hardware, and the above CPU 710, ROM 713, RAM 715 and/or storage unit 717 may not be necessary. Alternatively, the functions of the above acquiring unit 701 and transmitter 702 may also be implemented by functional software in combination with the above CPU 710, ROM 713, RAM 715 and/or storage unit 717 etc.

In the power control methods shown in FIGS. 4 and 5 and the wireless devices shown in FIGS. 6 and 7, the data channel transmission power of the first wireless device may be determined based on the data channel transmission power of the second wireless device as described above. In the following, a detailed description will be made to the power control method in combination with several embodiments.

First Embodiment

In the first embodiment, the data channel transmission power of the first wireless device is determined not only based on the transmission power of the second wireless device, but also based on a transmission path loss between the first wireless device and the second wireless device.

Figure 8:
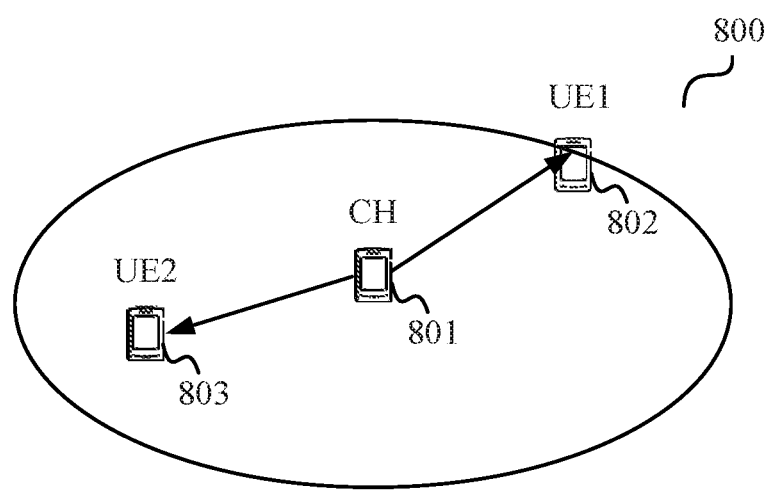
FIG. 8 is a schematic diagram showing a D2D communication scenario according to a first embodiment of the embodiment.

FIG. 8 is a schematic diagram showing a D2D communication scenario according to the first embodiment of the embodiment. As shown in FIG. 8, the UEs 801-803 form a UE cluster 800 with a centralized structure, wherein the UE 801 functions as the cluster head (CH), while the UEs 802 and 803 function as the slave UEs. Assume that the UE2 803 is the transmitting UE and the UE1 802 is the receiving UE. The UE2 803 corresponds to the first wireless device described above with reference to FIGS. 4-7, and the CH 801 corresponds to the second wireless device described above with reference to FIGS. 4-7.

Figure 9:
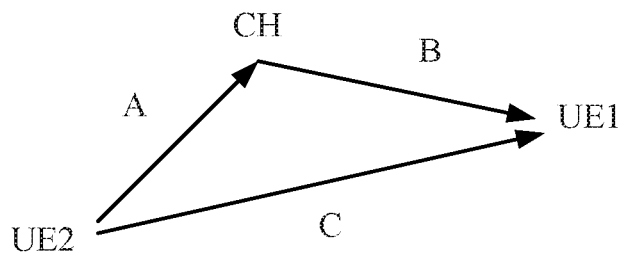
FIG. 9 is a schematic diagram showing the basic principle applied to the D2D communication scenario of the first embodiment.

FIG. 9 is a schematic diagram showing the basic principle applied to the D2D communication scenario of the first embodiment shown in FIG. 8. As shown in FIG. 9, the power used for compensating path loss between UE2 and CH is represented by the arrow marked with symbol A. The data channel transmission power of the CH is represented by the arrow marked with symbol B. The power necessary for the transmitting UE2 to transmit data signal to the receiving UE1 is represented by the arrow marked with symbol C. Then, the sum of A and B is always larger than or equal to C regardless of CH's position. In other words, whatever CH's position is, the sum of A and B could always satisfy UE2's transmission requirement. In most cases, the power value based on the sum of A and B exceeds the real requirement.

Based on this principle, the data channel transmission power of the transmitting UE2 may be determined based on the data channel transmission power of the CH, and the transmission path loss between the UE2 and the CH.

In particular, the data channel transmission power of the transmitting UE2 may be derived from the following equation (1):

$$P\_slave = P\_pathloss + P\_CH \quad (1)$$

Wherein, P_slave is the data channel transmission power of the slave UE, i.e., the first wireless device described above with reference to FIGS. 4-7. P_CH is the data channel transmission power of the CH, i.e., the second wireless device described above with reference to FIGS. 4-7. P_pathloss is the transmission path loss between the first wireless device and the second wireless device.

Further, in order to compensate for the channel fading, a margin power value may be introduced. That is, the data channel transmission power of the transmitting UE2 may be derived from the following equation (2):

$$P\_slave = P\_pathloss + P\_CH + P\_margin \quad (2)$$

Wherein, the meanings of P_slave, P_CH, and P_pathloss are the same as those in the equation (1), and P_margin is the margin power value for compensating for the channel fading, such as the fast fading. The determination of the margin power value is known to those skilled in the art, and will not be described here in detail.

In the above equations (1) and (2), the transmission path loss may be determined from the reference signal transmission power and reception power as follows:

$$P\_pathloss = P\_CH_{RS} - RSRP \quad (3)$$

Wherein, $P\_CH_{RS}$ is the reference signal transmission power of the CH, and RSRP is the reference signal reception power measured at the slave UE2.

The above equation (3) may be substituted into the above equation (1) or (2). In particular, the reference signal transmission power $P\_CH_{RS}$ of the CH may be the same as the data channel signal transmission power P_CH of the CH or may be different. When they are the same, for example, the above equation (2) may be further expressed as follows:

$$P\_slave = P\_pathloss + P\_CH + P\_margin \quad (4)$$

$$= P\_CH - RSRP + P\_CH + P\_margin$$

$$= 2 \times P\_CH - RSRP + P\_margin$$

In the first embodiment of the present disclosure, on one hand, the second data channel transmission power may be included in the power control information and signaled by the second wireless device to the first wireless device. On the other hand, the transmission path loss between the first wireless device and the second wireless device may be determined based on a reference signal reception power measured at the first wireless device, and a reference signal transmission power of the second wireless device which, generally, may be the same as the second data channel transmission power signaled to the first wireless device. Thereby, the first wireless device may determine its data channel transmission power based on the above equations.

With the first embodiment of the present disclosure, the large power consumption of the first wireless device and the interference to non-targeted wireless devices can be avoided, due to the accurate power control irrespective to the position of the second wireless device (the CH).

Second Embodiment

In the second embodiment of the present disclosure, the first data channel transmission power is determined only based on the second data channel transmission power, when the second wireless device is determined to be at an edge of the cluster.

Figure 10:
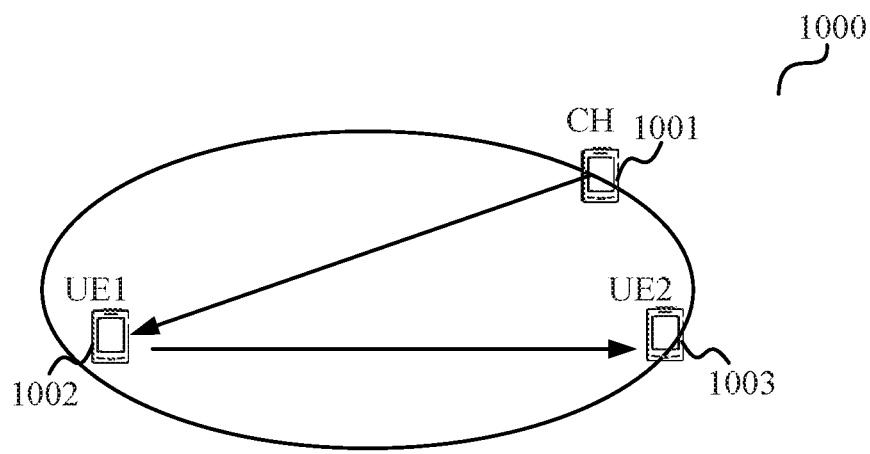
FIG. 10 is a schematic diagram showing a D2D communication scenario according to a second embodiment of the embodiment.

FIG. 10 is a schematic diagram showing a D2D communication scenario according to the second embodiment of the embodiment. As shown in FIG. 10, the UEs 1001-1003 form a UE cluster 1000 with a centralized structure, wherein the UE 1001 functions as the cluster head (CH), while the UEs 1002 and 1003 function as the slave UEs. Assume that the UE1 1002 is the transmitting UE and the UE2 1003 is the receiving UE. The UE1 1002 corresponds to the first wireless device described above with reference to FIGS. 4-7, and the CH 1001 corresponds to the second wireless device described above with reference to FIGS. 4-7.

In FIG. 10, the position of the CH 1001 is known and it is located at the edge of cluster. Since the CH's data channel transmission power could compensate path loss of farthest UE and any slave UE's data channel transmission power used to compensate path loss to other UEs should not exceed CH's data channel transmission power, the UE1 1002 can reach the farthest UE2 1003 by using the same power as the CH's data channel transmission power. That is, in this embodiment, the first data channel transmission power may be the same as the second data channel transmission power.

Further, similarly to that in the first embodiment, considering the channel fading, the margin power value may also be included, and the first data channel transmission power may be derived as follows:

$$P\_slave = P\_CH + P\_margin \quad (5)$$

The meanings of the parameters in the equation (5) are the same as those described in the first embodiment, and will not be described here in detail.

Therefore, in this embodiment, the key matter is to know the position of CH. In practical implementations, there are many ways to locate the CH. For example, the position of CH may be determined from a positioning system, a positioning channel or a positioning signal. For another example, the position of CH may be determined from a pre-coding character. For a further example, the position of CH may be determined from a beamformed reception signal at the CH. The detailed process of locating the CH is known to those skilled in the art, and will not be described here in detail.

With the second embodiment of the present disclosure, similarly, the large power consumption of the first wireless device and the interference to non-targeted wireless devices can be avoided. Furthermore, by comparing the equation (5) of the second embodiment with the equation (2) of the first embodiment, it can be seen that the term of P_pathloss is removed. Therefore, the data channel transmission power of the first wireless device may be further reduced by utilizing the position information of the second wireless device.

Third Embodiment

In either the first embodiment or the second embodiment, the data channel transmission power of the first wireless device is relatively fixed after being determined. However, with the change of the second wireless device's position, the data channel transmission power of the first wireless device may also be changed accordingly.

In particular, in the third embodiment, the first data channel transmission power may be changed between a power based on the second data channel transmission power and a transmission path loss between the first wireless device and the second wireless device, and a power only based on the second data channel transmission power, according to the position of the second wireless device.

Figure 11:
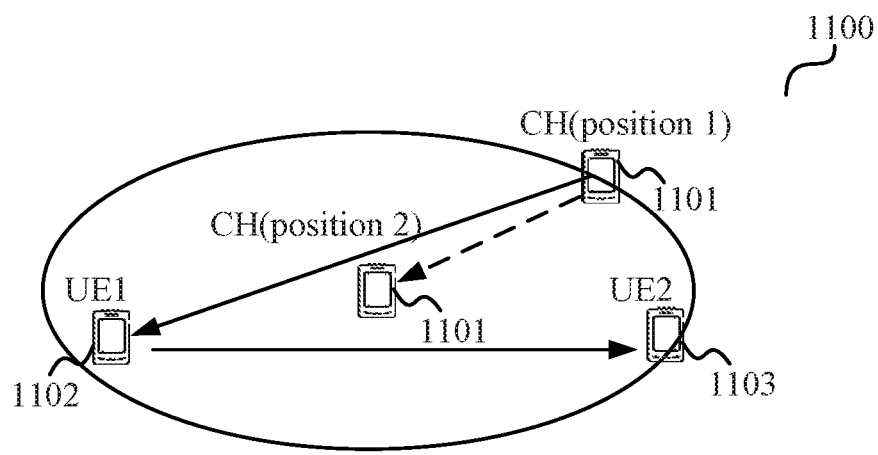
FIG. 11 is a schematic diagram showing a D2D communication scenario according to a third embodiment of the embodiment.

FIG. 11 is a schematic diagram showing a D2D communication scenario according to the third embodiment of the embodiment. As shown in FIG. 11, the UEs 1101-1103 form a UE cluster 1100 with a centralized structure, wherein the UE 1101 functions as the cluster head (CH), while the UEs 1102 and 1103 function as the slave UEs. Assume that the UE1 1102 is the transmitting UE and the UE2 1103 is the receiving UE. The UE1 1102 corresponds to the first wireless device described above with reference to FIGS. 4-7, and the CH 1101 corresponds to the second wireless device described above with reference to FIGS. 4-7.

In case the CH 1101 is in position 1, i.e., at the edge of the cluster, the power control method based on the second embodiment may be used. That is, the data channel transmission power of the UE1 1102 is determined only based on the data channel transmission power of the CH 1101. In case the CH 1101 is moved into position 2, i.e., not at the edge of the cluster, the power control method based on the first embodiment may be used. That is, the data channel transmission power of the UE1 1102 is determined based on the data channel transmission power of the CH 1101 and the transmission path loss between the CH 1101 and the UE1 1102.

The information on which power control method is used may be signaled by a higher layer signaling or a L1 signaling.

With the third embodiment of the present disclosure, similarly, the large power consumption of the first wireless device and the interference to non-targeted wireless devices can be avoided. Further, an optimized power control scheme can be used corresponding to different scenarios, e.g., different positions of the second wireless device.

Fourth Embodiment

In the first to three embodiments, description has been made on how to control the data channel transmission power of the first wireless device, e.g., the slave UE. In the following fourth embodiment, the power control method with respect to the second wireless device, e.g., the CH, will be described.

Assuming the same scenario as that in FIG. 8, the data channel transmission power of the second wireless device may be determined from a reference signal.

In particular, the data channel transmission power of the second wireless device may be determined at the first wireless device side or the second wireless device side. For an example, the data channel transmission power of the second wireless device may be determined at the first wireless device side, from a reference signal reception power measured at the first wireless device, a reference signal transmission power of the second wireless device and a minimum signal reception power common to all the wireless devices in the cluster.

That is, as shown in FIG. 8, the data channel transmission power of the CH 801 may be determined from the following equation (6):

$$P\_CH = P\_CH_{RS} - RSRP + P\_threshold \quad (6)$$

Wherein, P_threshold is the minimum signal reception power common to all the wireless devices in the cluster, and the meanings of P_CH, P_CH$_{RS}$ and RSRP are the same as those in the above equations, and will not be described here in detail.

It is to be noted that the above description has been made with reference to two slave UEs. However, it also applies to more than two salve UEs. In particular, suppose that the cluster comprise multiple wireless devices including the first wireless device, the second wireless device, and a third wireless device, and the second data channel transmission power may be determined from a minimum value between the reference signal reception power measured at the first wireless device and a reference signal reception power measured at the third wireless device, the reference signal transmission power of the second wireless device, and a minimum signal reception power common to all the wireless devices in the cluster, which may be expressed by the following equation (7):

$$P\_CH = P\_CH_{RS} - \min(RSRP\_ue_1, RSRP\_ue_2, RSR-P\_ue_3, \ldots RSRP\_ue_n) + P\_threshold \quad (7)$$

Wherein, min(RSRP_ue$_1$,RSRP_ue$_2$,RSRP_ue$_3$, . . . RSRP_ue$_n$) is the minimum value of the reference signal reception power measured at all (a number of n) slave UEs in the cluster, and the meanings of P_CH, P_CH$_{RS}$, and P_threshold are the same as those described in the above equations, and will not be described here in detail.

Further, it is to be noted that the above description has been made with reference to the case in which the second data channel transmission power is determined at the first wireless device side. However, as described above, it may also be determined at the second wireless device side. That is, the second data channel transmission power may be determined from a reference signal reception power measured at the second wireless device, a reference signal transmission power of the first wireless device and a minimum signal reception power common to all the wireless devices in the cluster.

When the cluster comprises multiple wireless devices including the first wireless device, the second wireless device and the third wireless device, similarly to the above example, the second data channel transmission power may be determined from a minimum value between the reference signal reception power measured at the second wireless device and a reference signal reception power measured at the third wireless device, the reference signal transmission power of the first wireless device, and a minimum signal reception power common to all the wireless devices in the cluster.

The detailed processing of determining the second data channel transmission power is similar to those in the above example, and will not be described here in detail.

Further, it is to be noted that the above description has been made with reference to the centralized D2D communication scenario. However, it also applies to the distributed D2D communication scenario. In this case, P_CH in the above equation (7) means the data channel transmission power of a target UE, e.g., a transmitting UE, $P\_CH_{RS}$ means the reference signal transmission power of the target UE, and $min(RSRP\_ue_1, RSRP\_ue_2, RSRP\_ue_3, \ldots RSRP\_ue_n)$ means the minimum value of the reference signal reception power measured at all the other (a number of n) UEs, e.g., all the receiving UEs, in the cluster.

With the fourth embodiment of the present disclosure, the transmission power of a transmitting wireless device can be optimized based on the coverage of receiving UEs, so that the transmitting wireless device does not always adopt the maximum transmission power, and the power consumption of the transmitting wireless device can be reduced.

Fifth Embodiment

In the above four embodiments, power control method on the data channel have been described. However, the power control method of the present disclosure may also be applied to the control channel, as in the following fifth embodiment.

In particular, in one example, the control channel transmission power of a wireless device may be determined from the data channel transmission power and an offset value as in the following equation (8).

$$P\_control = P\_data + P\_offset \quad (8)$$

Wherein, P_control is the control channel transmission power of a wireless device, P_data is the data channel transmission power of the same wireless device which may be determined according to any one of the above embodiments, and P_offset is the offset or compensation factor used for the control channel, which may be specified or configured by a high layer signaling, such as a RRC signaling.

Therefore, with this example, the power of other channel, such as the control channel, does not need to be a fixed or maximum value, and may be optimized depending on the situation, just like the power of data channel as described in the above embodiments.

In another example, in order to guarantee the robustness of the control channel, the power control of the control channel may be independent with that of the data channel. For example, the control channel could always be set with the maximum power value regardless of the data channel's situation.

(Variants)

In the above first to fifth embodiments, the power control information transmitted from the second wireless device to the first wireless device includes the data channel transmission power of the second wireless device, i.e., the second data channel transmission power, and then the first wireless device determines its own data channel transmission power, i.e., the first data channel transmission power, based on the second data channel transmission power.

However, the determination process may also be performed by the second wireless device, and only the determination result is transmitted to the first wireless device.

That is, in this case, the second wireless device acquires its own second data channel transmission power. Then, the second wireless device determines the first data channel transmission power based on the second data channel transmission power, with the power control method according to any one of the above embodiments. And then, the second wireless device incorporates the determination result, that is, the first data channel transmission power, into the power control information, and transmit the power control information to the first wireless device. Accordingly, the first wireless device receives the power control information indicating the first data channel transmission power, and controls the data channel transmission power of the first wireless device according to the first data channel transmission power. For example, the first wireless device controls its own data channel transmission power to be the first data channel transmission power.

With this variant of the present disclosure, the processing load on the first wireless device can be reduced.

The above embodiments of the present disclosure are only exemplary description, and their specific structures and operations do not limit the scope of the disclosure. Those skilled in the art can recombine different parts and operations of the above respective embodiments to produce new implementations which equally accord with the concept of the present disclosure.

The embodiments of the present disclosure may be implemented by hardware, software and firmware or in a combination thereof, and the way of implementation does not limit the scope of the present disclosure.

The connection relationships between the respective functional elements (units) in the embodiments of the disclosure do not limit the scope of the present disclosure, in which one or multiple functional element(s) or unit(s) may contain or be connected to any other functional elements.

Although several embodiments of the present disclosure has been shown and described in combination with attached drawings above, those skilled in the art should understand that variations and modifications which still fall into the scope of claims and their equivalents of the present disclosure can be made to these embodiments without departing from the principle and spirit of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit, which, in operation controls a process performed at a first wireless device communicable with a second wireless device and a third wireless device, the process comprising:
   receiving, at the first wireless device, power control information including a reference signal transmission power of the second wireless device, from the second wireless device, wherein the second wireless device is communicable with other wireless devices including the first and third wireless devices;
   calculating, at the first wireless device, a transmission path loss between the first wireless device and the second wireless device using the reference signal transmission power of the second wireless device and a reference signal received power (RSRP); and
   determining, at the first wireless device, a first data channel transmission power of the first wireless device at which to perform communication directly between the first wireless device and the third wireless device, based at least on the transmission path loss between the first wireless device and the second wireless device.

2. The integrated circuit according to claim 1, wherein power control of a control channel is independently performed from that of the first data channel.

3. The integrated circuit according to claim 1, wherein the reference signal transmission power of the second wireless device is determined from a minimum value between a RSRP measured at the first wireless device and a RSRP measured at the third wireless device and from a minimum signal reception power common to all the wireless devices.

4. The integrated circuit according to claim 1, wherein the reference signal transmission power of the second wireless device is determined from a RSRP measured at the second wireless device, a reference signal transmission power of the first wireless device, and a minimum signal reception power common to all the wireless devices.

5. The integrated circuit according to claim 4, wherein the reference signal transmission power of the second wireless device is determined from a minimum value between the RSRP measured at the second wireless device and a RSRP measured at the third wireless device, the reference signal transmission power of the first wireless device, and the minimum signal reception power common to all the wireless devices.

6. The integrated circuit according to claim 1, wherein the first and third wireless devices perform device-to-device (D2D) communication.

* * * * *